US008150919B2

(12) United States Patent
Clarke et al.

(10) Patent No.: US 8,150,919 B2
(45) Date of Patent: *Apr. 3, 2012

(54) METHOD AND SYSTEM FOR TRANSITIONING BETWEEN SYNCHRONOUS AND ASYNCHRONOUS COMMUNICATION MODES

(75) Inventors: Simon P. Clarke, Seattle, WA (US); David Rasmussen, Redmond, WA (US); Igor Kofman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/115,784

(22) Filed: May 25, 2011

(65) Prior Publication Data

US 2011/0225242 A1    Sep. 15, 2011

Related U.S. Application Data

(63) Continuation of application No. 11/035,617, filed on Jan. 14, 2005, now Pat. No. 7,953,794.

(51) Int. Cl.
*G06F 15/16* (2006.01)
(52) U.S. Cl. ........................ 709/204; 709/205; 709/227
(58) Field of Classification Search .................. 709/204, 709/205, 227
See application file for complete search history.

(56) References Cited

U.S. PATENT DOCUMENTS

| 5,600,834 A | 2/1997 | Howard ........................ 395/617 |
| 5,787,262 A | 7/1998 | Shakib et al. ............ 395/200.35 |
| 5,806,078 A | 9/1998 | Hug et al. ..................... 707/511 |
| 5,890,177 A | 3/1999 | Moody et al. ................. 707/511 |
| 6,006,239 A | 12/1999 | Bhansali et al. .............. 707/201 |
| 6,058,416 A | 5/2000 | Mukherjee et al. ........... 709/203 |
| 6,067,551 A | 5/2000 | Brown et al. ................. 707/203 |
| 6,212,534 B1 | 4/2001 | Lo et al. ........................ 707/511 |
| 6,240,414 B1 | 5/2001 | Beizer et al. ...................... 707/8 |
| 6,341,291 B1 | 1/2002 | Bentley et al. ................ 707/203 |
| 6,938,042 B2 * | 8/2005 | Aboulhosn et al. ................... 1/1 |
| 7,296,023 B2 * | 11/2007 | Geyer et al. ........................... 1/1 |

(Continued)

FOREIGN PATENT DOCUMENTS

EP    0 907 125    7/1999

(Continued)

OTHER PUBLICATIONS

Milojicic, Dejan S. et al.: "Peer-to-Peer Computing" Jul. 10, 2002.*

(Continued)

*Primary Examiner* — Yves Dalencourt
*Assistant Examiner* — Michael C Lai
(74) *Attorney, Agent, or Firm* — Merchant & Gould (57) ABSTRACT

Many different users may access, revise and update the same shared object simultaneously through several different transports. Clients may communicate asynchronously by accessing the shared object through a physical server. Clients may also communicate synchronously by accessing the shared object through a peer-to-peer network. A manifest file associated with the shared object identifies the locations where other versions and instances of the shared object are stored. The shared object and the associated manifest file allow a client to transition seamlessly between local access, synchronous and asynchronous communication such that the user is not aware that the mode of communication has changed. A user may change location and any available data sharing transports are automatically identified. Thus, the user may access a shared object and collaborate with other authorized users through different mechanisms.

20 Claims, 10 Drawing Sheets

U.S. PATENT DOCUMENTS

| | | | |
|---|---|---|---|
| 7,593,943 B2* | 9/2009 | Clarke et al. | 1/1 |
| 7,594,163 B2* | 9/2009 | Slack-Smith | 715/200 |
| 7,711,771 B2* | 5/2010 | Kirnos | 709/203 |
| 7,953,794 B2* | 5/2011 | Clarke et al. | 709/204 |
| 2002/0188667 A1 | 12/2002 | Kirnos | 709/203 |
| 2003/0097410 A1 | 5/2003 | Atkins | 709/206 |
| 2003/0112273 A1 | 6/2003 | Hadfield et al. | 715/751 |
| 2005/0039116 A1 | 2/2005 | Slack-Smith | 715/511 |
| 2005/0165859 A1 | 7/2005 | Geyer et al. | 707/201 |
| 2006/0059481 A1* | 3/2006 | Smith et al. | 717/173 |
| 2006/0136441 A1* | 6/2006 | Fujisaki | 707/101 |

FOREIGN PATENT DOCUMENTS

| | | |
|---|---|---|
| EP | 0 974 895 | 1/2000 |
| JP | 06-324928 | 11/1994 |
| JP | 10-003417 | 1/1998 |
| JP | 2003-099337 | 4/2003 |
| JP | 2004-171083 | 6/2004 |
| JP | 2004-326176 | 11/2004 |
| WO | 01/16804 | 3/2001 |
| WO | 01/33383 | 10/2001 |
| WO | 03/085525 | 10/2003 |
| WO | 2004/064481 | 5/2004 |

OTHER PUBLICATIONS

Office Action issued Sep. 26, 2011, in KR Pat. Appl. No. 10-2005-09114108, w/translation.
Office Action issued Oct. 14, 2011, in JP Appl. No. 2005-355259, w/translation.
Dejan S. Milokicic, et al., "Peer-to-Peer Computing" Jul. 10, 2002; 35 pgs.
Aberer, et al.; "An Overview on Peer-to-Peer Information Systems" Distributed Data & Structures; vol. 14, Mar. 20, 2002, pp. 171-188; XP002374788.
Borghoff et al.; "Application of collaborative editing to software-engineering projects"; ACM SIGSOFT, 18(3): pp. 56-64, Jul. 1993.
Vogel, et al.; "Consistency Control for Synchronous and Asynchronous Collaboration Based on Shared Objects and Activities"; 2005; Computer Supported Cooperative Work (2004); pp. 573-602.
Office Action mailed Nov. 21, 2008 in Chinese Patent Application No. 200510131672.7.
Office Action mailed Sep. 4, 2009, in Chinese Patent Application No. 200510131672.7.
Search Report mailed May 18, 2006, in European Patent Application No. 05112293.5.
Office Action mailed Feb. 19, 2007, in European Patent Application No. 05112293.5.
Office Action mailed Apr. 29, 2008, in European Patent Application No. 05112293.5.
Office Action mailed Jun. 21, 2010, in Australian Patent Application No. 2005234676.
Communication of Office Action mailed Sep. 11, 2008, in Chilean Patent Application No. 57-2006.
Communication of Office Action mailed May 19, 2009, in Chilean Patent Application No. 57-2006.
Office Action mailed Oct. 24, 2008, in Chinese Patent Application No. 200510131665.7.
Communication of Office Action mailed May 20, 2009, in Egyptian Patent Application No. 15/2006.
Communication of Office Action mailed May 10, 2010, in Egyptian Patent Application No. 15/2006.
Search Report mailed Jun. 6, 2007, in European Patent Application No. 05112294.3.
Office Action mailed Jan. 24, 2008, in European Patent Application No. 05112294.3.
Office Action mailed Sep. 8, 2010, in European Patent Application No. 05112294.3.
Communication of Office Action mailed Nov. 26, 2008, in Mexican Patent Application No. PA/a/2005/013617.
Office Action mailed May 22, 2009, in Malaysian Patent Application No. PI 20055857.
Office Action mailed Dec. 21, 2005, in New Zealand Patent Application No. 544151.
Office Action mailed Aug. 29, 2008, in New Zealand Patent Application No. 544151.
Office Action mailed Aug. 26, 2008, in Philippine Patent Application No. 1-2005-000604.
Office Action mailed Oct. 28, 2009, in Philippine Patent Application No. 1-2005-000604.
Office Action mailed Apr. 21, 2008, in Singapore Patent Application No. SG 200508288-8.
Office Action issued Mar. 22, 2011, in JP Pat. Appl. No. 2005-355259, w/translation.
Office Action issued Jun. 3, 2011, in JP Pat. Appl. No. 2005-359520, w/translation.

* cited by examiner

METHOD AND SYSTEM FOR TRANSITIONING BETWEEN SYNCHRONOUS AND ASYNCHRONOUS COMMUNICATION MODES

RELATED APPLICATIONS

This application is a continuation of and claims priority to application Ser. No. 11/035,617, filed Jan. 14, 2005, entitled METHOD AND SYSTEM FOR TRANSITIONING BETWEEN SYNCHRONOUS AND ASYNCHRONOUS COMMUNICATION MODES, now granted as U.S. Pat. No. 7,953,794, which is hereby incorporated herein by reference.

BACKGROUND OF THE INVENTION

File sharing applications allow several different users to collectively share information. Several clients may access the shared file asynchronously on a server. A client may establish a peer-to-peer network with another client such that both clients may access the shared file synchronously and directly (i.e., in real time). A client may be accessing the shared file on either the peer-to-peer network or the server when connectivity is lost. Connectivity to the server may be lost when the server crashes or when the client disconnects from the server. Connectivity to the peer-to-peer network may be lost when two clients are no longer in the same vicinity or when one of clients disconnects from the peer-to-peer network. In either case, the client must manually reconnect to a peer-to-peer network or a server to regain access to the shared file.

SUMMARY OF THE INVENTION

The present invention is directed to a method and system for transitioning between synchronous and asynchronous communication modes. Many different users may access, revise and update the same shared object simultaneously through several different transports. The object may be any entity capable of being shared such as a file. Clients may communicate asynchronously by accessing the shared object through a physical server. Server limitations may cause shared object synchronizations to be delayed from the time the revisions are implemented by a user. Clients may also communicate synchronously by accessing the shared object through a peer-to-peer network. A peer-to-peer network allows revisions to the shared object to be directly transferred between clients instead of through a server.

Each shared object is associated with a manifest file. The manifest file identifies the locations where other versions and instances of the shared object are stored within the system. The client accesses a shared object and retrieves the associated manifest file from a location identified by a unique location identifier in the corresponding shared object. The shared object and the manifest file allow a client to transition seamlessly between local access, synchronous and asynchronous communication such that the user is not aware that the mode of communication has changed. A user may change location and any available data sharing transports are automatically identified. Thus, the user may access a shared object and collaborate with other authorized users through different mechanisms.

A client may access a shared object on a server. The client is automatically connected to other clients that are also accessing the shared object. Other clients that are authorized to access the shared object are included in a peer group. The client retrieves a manifest file associated with the shared object. The manifest file identifies the locations of different versions and instances of the shared object. Thus, the client may establish a peer-to-peer network with any other client in the peer group when any client in the peer group accesses a version or an instance of the shared object identified in the manifest file. The client may then disconnect from the server and continue to access the shared object on the peer-to-peer network.

A client may access a shared object from a peer-to-peer network. The client retrieves the manifest file associated with the shared object. The manifest file identifies other locations where the shared object exists. The client may access the shared object on a server and determine which authorized clients are also connected to the server. The connected clients may be accessed through the server when the peer-to-peer network is not available. The client may then disconnect from the peer-to-peer network and continue to access the shared object on the server.

In one aspect of the invention, a shared object is accessed. A manifest file associated with the shared object is retrieved. The manifest file identifies the location where another instance of the shared object is stored. Direct synchronous communication is established with at least one client that is also accessing the instance of the shared object identified in the manifest file. Asynchronous communication is established with at least one client that is also accessing the shared object on a server.

DETAILED DESCRIPTION OF THE PREFERRED EMBODIMENT

The present invention is directed to a method and system for transitioning between synchronous and asynchronous communication modes. Many different users may access, revise and update the same shared object simultaneously through several different transports. Clients may communicate asynchronously by accessing the shared object through a physical server. Clients may also communicate synchronously by accessing the shared object through a peer-to-peer network.

Each shared object is associated with a manifest file. The manifest file identifies the locations where other versions and instances of the shared object are stored within the system. The client accesses a shared object and retrieves the associated manifest file from a location identified by a unique location identifier in the corresponding shared object. The shared object and the manifest file allow a client to transition seamlessly between local access, synchronous and asynchronous communication such that the user is not aware that the mode of communication has changed. A user may change location and any available data sharing transports are automatically identified. Thus, the user may access a shared object and collaborate with other authorized users through different mechanisms.

Illustrative Operating Environment

Figure 1:
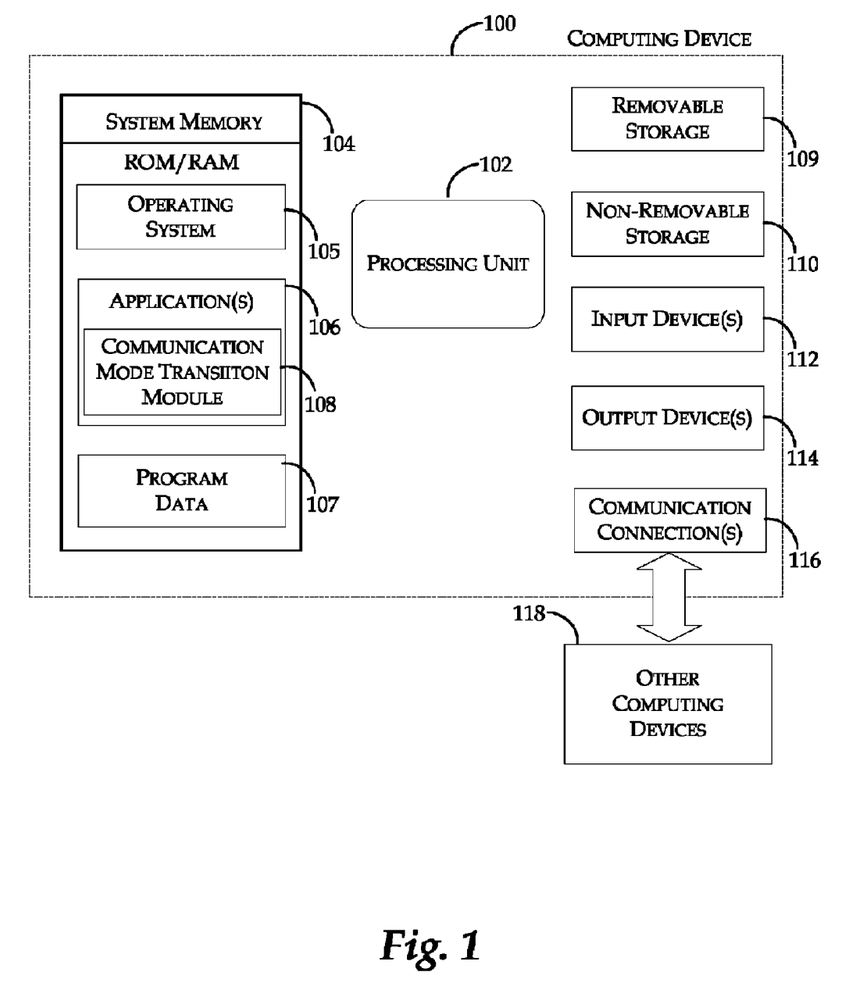
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A communication mode transition module 108, which is described in detail below, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Transitioning between Synchronous and Asynchronous Communication Modes

Figure 2:
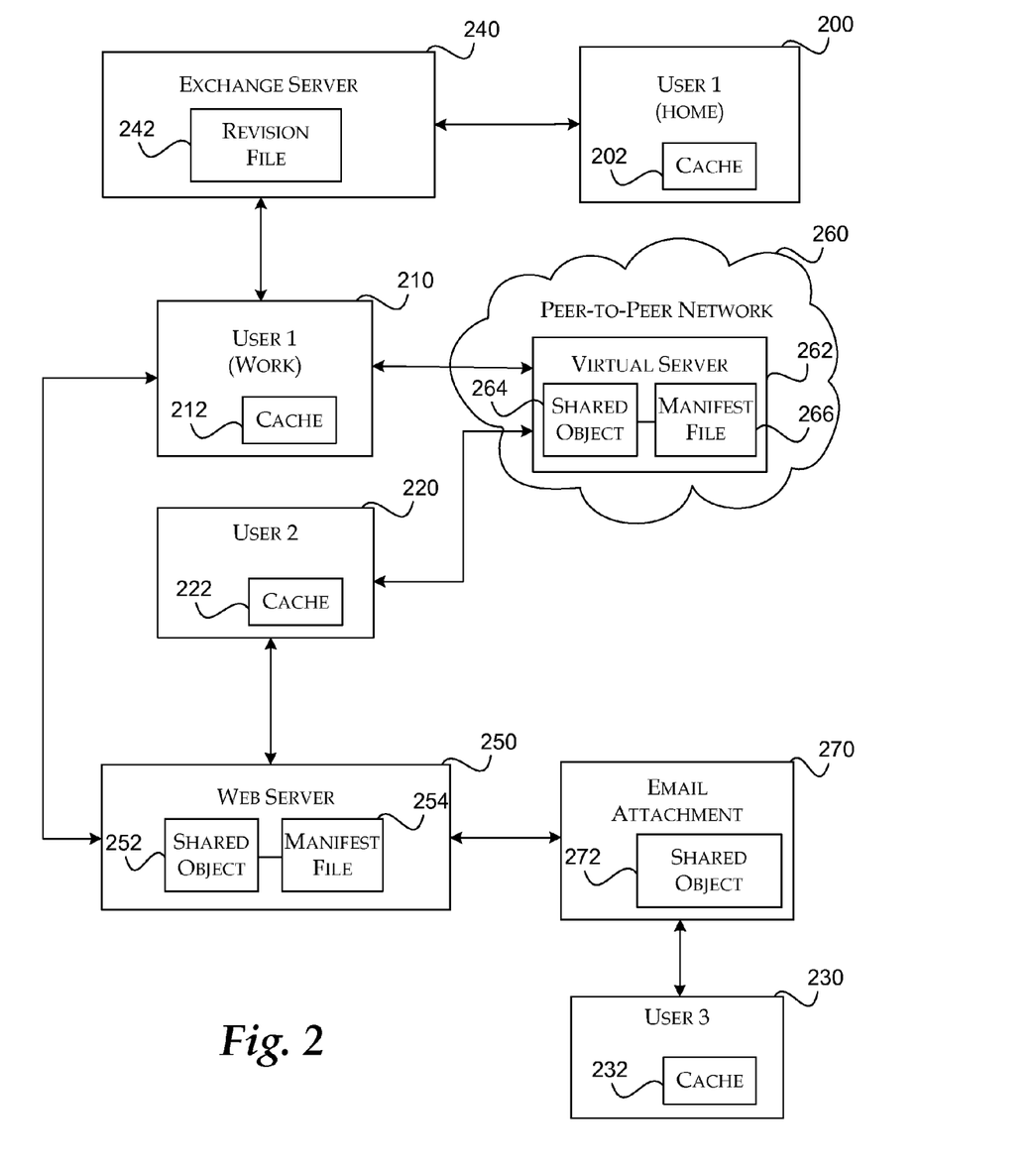
FIG. 2 illustrates a block diagram of a system for synchronizing multiple user revisions to a shared object, in accordance with the present invention.

FIG. 2 illustrates a block diagram of a system for synchronizing multiple user revisions to a shared object. The object may be any entity capable of being shared such as a file. The system includes clients 200, 210, 220, 230, an email server with file storage capability such as exchange server 240, web server 250, peer-to-peer network 260 and email attachment 270. Clients 200, 210 are coupled to exchange server 240. Clients 210, 220 are coupled to web server 250. Clients 210, 220 are also coupled together through peer-to-peer network 260. Email attachment 270 is arranged to be transferred to and from client 230 by web server 250. Clients 200, 210 are both associated with the same user (User 1). For example, client 200 is accessed by User 1 at home, and client 210 is accessed by User 1 at work. Clients 220, 230 are associated with different users (User 2 and User 3, respectively). Clients 200, 210, 220, 230 each include cache 202, 212, 222, 232 for locally storing a shared object. Peer-to-peer network 260 includes virtual server 262 for transferring a shared object between clients 210, 220. Revision file 242 and shared objects 252, 264, 272 are stored in exchange server 240, web server 250, virtual server 262 and email attachment 270, respectively. Revision file 242 and shared objects 252, 264, 272 may be associated with a peer group identifier. The peer group identifier identifies the users who are authorized to access and revise a particular shared object (i.e., the peer group). In one embodiment, the peer group identifier is a uniform resource locator (URL) to the peer group that may be resolved to any web client. Shared objects 252, 264 are associated with manifest files 254, 266, respectively.

Many different users may access, edit and update the same shared object simultaneously through several different transports. For example, User 1 at client 210 and User 2 at client 220 may access shared object 252 from web server 250. The shared object is stored locally in corresponding cache 212, 222. Both User 1 and User 2 may revise shared object 252. The revisions are synchronized with shared object 252 on web server 250 such that User 1 can see the revisions made by User 2, and User 2 can see the revisions made by User 1.

In another example, User 3 may share access of shared object 272 with User 2 through email attachment 270. User 2 may revise a locally stored shared object and send an email message to User 3 with the entire shared object or just the revisions to the shared object attached. The revisions made by User 2 are synchronized with shared object 252 on web server 250. When the email is received at client 230, the revisions made by User 2 are automatically synchronized with the local shared object stored in cache 232. User 3 may then make further revisions to shared object 272 and reply to User 2 with the entire shared object or just the revisions to the shared object included as email attachment 270. The revisions made by User 3 are synchronized with shared object 252 on web server 250. The shared object at client 220 is also updated to include the revisions made by User 3.

In another example, User 1 may access a shared object either at home on client 200 or at work on client 210 through exchange server 240. Exchange servers are often utilized when access to an external server is not permitted or not available. Revision file 242 includes revisions to the shared object. Revision file 242 may be transferred between clients 200, 210 through a universal serial bus (USB) drive, an email application, or some other mechanism that allows revisions to be transferred back and forth. The revisions are applied to clients 200, 210 such that the local shared object stored in caches 202, 212 may be updated.

Exchange server 240 may have a restriction on the size of files it can handle (e.g., 2 megabytes maximum). User 1 may upload revision file 242 that includes any revisions to the shared object from client 200 to exchange server 240. Revision file 242 may be transferred from client 200 to client 210 in subsections when revision file 242 exceeds the size limitations of exchange server 240. The file protocol permits a request/fill process for transferring the subsections. In one embodiment, exchange server 240 is associated with an email application. Revisions made by another user (User 2) may be transferred from client 220 to client 210 through web server 250 or peer-to-peer network 260 and then transferred to client 200 through an email account issued to User 1. In another embodiment, client 200 periodically polls exchange server 240 for a current revision file.

In another example, peer-to-peer network 260 may be established between clients 210, 220 when the connection from clients 210, 220 to web server 250 is lost or when User 1 and User 2 prefer to communicate directly and synchronously in real time. User 1 and User 2 may prefer to communicate through peer-to-peer network 260 because object sharing over web server 250 may result in a lag between when revisions are made at client 210 and when the revisions are available at client 220. The lag may be a result of heavy server traffic. Peer-to-peer network 260 allows revisions to the shared object to be directly transferred between clients 210, 220 instead of through web server 250. In one embodiment, peer-to-peer network 260 is a transmission control protocol/internet protocol (TCP/IP) direct network. The TCP/IP direct network allows revisions to be stored and retrieved quickly.

Clients 210, 220 may each have a copy of shared object 252 locally stored in cache 212, 222 when web server 250 connectivity is interrupted. The peer group identifier associated with shared object 252 indicates that both User 1 and User 2 are accessing the shared object simultaneously. The users become aware of each other when they both access an established peer-to-peer network (e.g., both users are working on laptop computers on the same airplane). Peer-to-peer network 260 allows User 1 and User 2 to simultaneously access revisions to shared object 264 on virtual server 262 and implement further revisions. The revisions are instantly replicated on clients 210, 220 such that User 1 and User 2 may actively collaborate on shared object 264. Peer-to-peer network 260 may be disabled when User 1 and User 2 are no longer in the same vicinity (e.g., each user returns to their respective offices) or when User 1 and User 2 no longer wish to communicate in real time. Shared object 252 may then be accessed from web server 250. The transition between accessing shared object revisions on peer-to-peer network 260 and web server 250 is automatic and seamless.

Clients 210, 220 may receive current revisions from both web server 250 and peer-to-peer network 260. Each revision made to the shared object is associated with a global unique identifier (GUID) and a time stamp. The time stamp identifies the time when the revision was made. Client 210 may modify shared object 252 on web server 250. Client 220 determines whether the local version of the shared object in cache 222 is current by comparing a GUID and a time stamp associated with the cached object to the GUID and the time stamp associated with shared object 252 on web server 250. If the current version is not stored locally, the latest revisions that have not been implemented in the cached object are loaded from web server 250 to client 220 and synchronized with the local file. Thus, the entire shared object need not be loaded to client 220 each time the local version of the shared object is updated.

In one embodiment, client 220 may determine from the GUID and the time stamp associated with the revision that the same modifications are available from peer-to-peer network 260. However, no action results because client 220 has already implemented the modifications. In another embodiment, client 220 may determine from the GUID and the time stamp associated with the revision that the same modifications are not available from peer-to-peer network 260. Thus, client 220 submits the revisions to peer-to-peer network 260 such that other users connected to peer-to-peer network 260 may synchronize with the current version of the shared object.

Client 220 may receive another revision from peer-to-peer network 260. The shared object in cache 222 is updated. Client 220 determines whether the current state of the shared object is also available on web server 250 using the GUID and the time stamp associated with the revision. If shared object 252 on web server 250 is not synchronized with the current state of the shared document, client 220 submits the latest revision to web server 250 such that shared object 252 may be updated.

Asynchronous communication may occur when a client revises the shared object while connected to the system through a physical server. Server limitations may cause shared object synchronizations to be delayed from the time the revisions are implemented by a user. In one embodiment, the client may be revising a locally cached version of the shared object while not connected to the system. Any revisions made by the client may be synchronized with the shared object when the client reconnects to the system through a server. The client may seamlessly transition between local access, synchronous and asynchronous communication such that the user is not aware that the mode of communication has changed. A user may change location and any available data sharing transports (e.g., peer-to-peer networks, servers) are automatically identified. Thus, the user may access a shared object and collaborate with other authorized users through different mechanisms.

Each shared object is associated with a manifest file. The manifest file identifies the locations where other versions and instances of the shared object are stored within the system. In one embodiment, the manifest file is an extensible markup language (XML) file. In another embodiment, the manifest file identifies multiple shared objects. In another embodiment, the manifest file may be associated with any object that may be shared between clients. For example, the manifest file may be associated with an entire shared object or any portion of the shared object (e.g., a content container, a section, a page, an outline, etc.).

The manifest file may be stored anywhere within the system. As shown in the figure, manifest file 254 is associated with shared object 252. Both shared object 252 and manifest file 254 are stored on web server 250. In another embodiment, the manifest file is stored in the shared object. In yet another embodiment, the manifest file is stored in an active directory. In still yet another embodiment, the manifest file is stored in multiple locations within the system. The manifest file is stored in a location identified by a unique location identifier. The unique location identifier may identify a file server, a shared area of a server, a web server, or a peer group.

The shared object may be accessed locally from a cache, through a server, or through a peer-to-peer network. The client retrieves the manifest file from the location identified by the unique location identifier in the corresponding shared object. In one embodiment, the client may store the manifest file locally for future reference. The manifest file indicates the location of any other versions and instances of the shared object within the system (e.g., in a substore or a peer group). If another version/instance of the shared object is stored in a peer group, the manifest file may include the corresponding peer group identifier.

In one embodiment, client 220 accesses shared object 252 on web server 250. Client 220 is automatically connected to other clients that are also accessing shared object 252 (e.g., the peer group). Client 220 retrieves manifest file 254 associated with shared object 252. Manifest file 254 identifies the locations of different versions and instances of shared object 252. Thus, client 220 may establish a peer-to-peer network with any other client in the peer group when any client in the peer group accesses a version/instance of shared object 252 identified by manifest file 254. Client 220 may then disconnect from web server 250 and continue to access shared object 252 on the peer-to-peer network.

In another embodiment, client 210 may access shared object 264 from peer-to-peer network 260. Client 210 retrieves manifest file 266 associated with shared object 264. Client 210 may connect to a server and determine which clients are also connected to the server. The connected clients may be accessed through the server when peer-to-peer network 260 is not available. Shared object 264 (or 252) and associated manifest file 264 (or 254) allow client 210 (or client 220) to transition automatically and seamlessly between asynchronous and synchronous communication modes.

Users are not blocked from accessing and revising a shared object when another user has access to the shared object. Any authorized users may simultaneously revise the shared object. In one embodiment, a brief instance of blocking may occur to ensure the integrity of the revision transaction. For example, a user may extensively revise the shared document while disconnected from the server. When the user reconnects to the server, other clients may be briefly blocked from accessing the shared object until all of the user's revision are implemented in the shared object.

Figure 3:
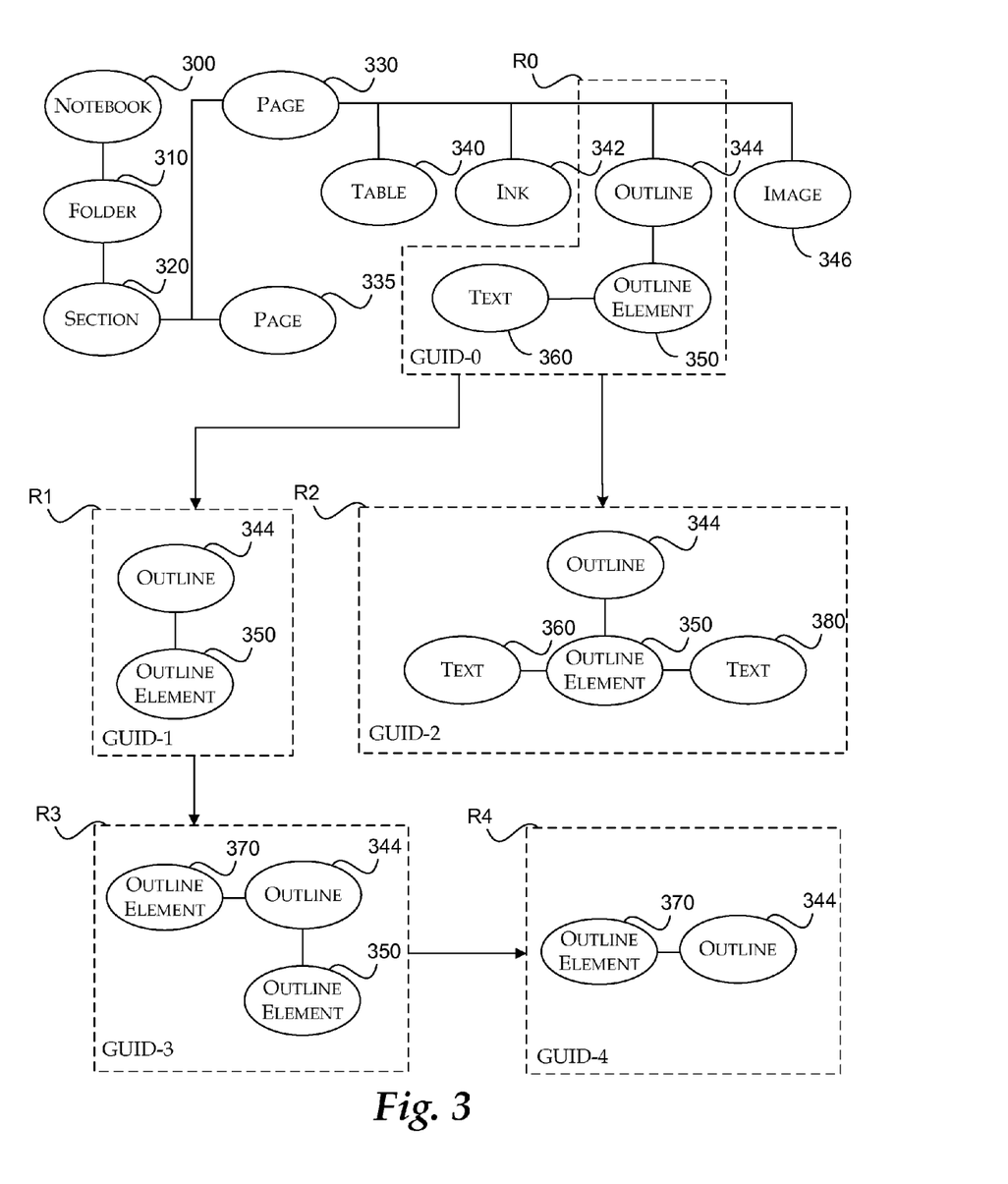
FIG. 3 illustrates a hierarchical graph of linked nodes that indicate different portions of a shared object, in accordance with the present invention.

FIG. 3 illustrates a hierarchical graph of linked nodes that indicate different portions of a shared object. In one embodiment, the shared object is a notebook that is shared among several users. Notebook node 300 symbolizes the entire shared object. Folder node 310 is included within notebook node 300. Section node 320 is included within folder node 310. Page nodes 330, 335 are included within section node 310. Table node 340, ink node 342, outline node 344, and image node 346 are included within page node 330. Outline element node 350 is included within outline node 344. Text node 360 is included within outline element node 350. Different nodes may be grouped together in a content container. For example, outline node 344, outline element node 350, and text node 360 may be grouped together as content container R0. Content container R0 is assigned a GUID (e.g., GUID-0). The GUID uniquely identifies content container R0.

A content container includes shared object content (e.g., a word, a sentence, a paragraph, a page, a table, a picture, handwriting, a uniform resource locator, or any combination of data included in the shared object). Content containers provide a dimension for object content that is grouped together. For example, a content container may correspond to a line, a paragraph, a page, or specific page elements (e.g., only the tables on a particular page).

The shared object stores an initial version of the graph. Specific operations may then be performed on individual content containers. For example, a user may revise the data of a content container. The revision to the shared object may be identified as a state of the content container. The shared object stores the revised content containers of the graph. A current state of the content container is compared to a previous state using GUIDs and time stamps such that a determination may be made whether the content container has been revised.

For example, two different users may each access the shared document and modify content container R0. One user may revise content container R0 by deleting text node 360 (as shown in revision R1). Revision R1 is stored in the shared object. Revision R1 is assigned a GUID (e.g., GUID-1) to uniquely identify the revised container and a timestamp that identifies the time and date when revision R1 is written to the shared object. Another user may revise content container R0 by adding text node 380 to outline element node 350 (as shown in revision R2). Revision R2 is stored in the shared object. Revision R2 is assigned a time stamp and a GUID (e.g., GUID-2) to uniquely identify the revised content container.

Different users may revise a shared object at different times such that multiple versions of the shared object may coexist. However, there is only one latest version of the shared object. In one embodiment, the latest version of the shared object is the version that includes the most recent revisions that are synchronized with the shared object and made available to other authorized users.

For example, a user may revise a content container of a shared object that is identified as revision R1 by adding outline element node 370 to outline node 344 (as shown in revision R3). Revision R3 is stored in the shared object. Revision R3 is also assigned a time stamp and a GUID (e.g., GUID-3) to uniquely identify the revised content container. Revision R3 is an extension of revision R1. Thus, revision R1 is the latest version of the shared object that the user was aware of (e.g., the locally stored version). The shared object is inspected to determine whether the latest version of the shared object is still revision R1. In one embodiment, the latest version of the shared object may be determined by comparing time stamps and GUIDs of different content containers. If the latest version of the shared object is associated with a more recent time stamp than revision R1 then another user (e.g., the user who created revision R2) has subsequently modified the same content container.

If another user has modified the same content container since revision R1 was synchronized with the shared object, any revisions that are an extension of revision R1 (e.g., revision R3) may not be synchronized with the shared object until any subsequent revisions are synchronized with the shared object and any conflicting revisions are resolved and merged. For example, revision R2 is synchronized with the shared object after revision R1. Thus, the latest version of the shared object includes revision R2. Before revision R3 is synchronized with the shared object, revision R3 is compared to revision R2 to determine if any revisions conflict. The comparison is necessary because revision R3 is an extension of revision R1 which is no longer associated with the latest version of the shared object. Revision R3 is determined to not conflict with revision R2 because outline element node 370 can be added to outline node 344 without disrupting revision R2.

In one embodiment, the shared object is revised by moving a content container from one location to another within the shared object. For example, table node 340 may be moved from page node 330 to page node 335. A determination is made that table node 340 has been moved but the new location cannot be determined. A proxy node is created at the original location of table node 340. The proxy node is implemented at the new location of table node 340 when the new location of table node 340 is determined. If table node 340 is deleted before the new location is determined, the proxy node is discarded.

Different users may simultaneously edit the shared object. Usually, the users are revising different content containers of the shared object. Thus, each user's revisions may be synchronized with the shared object without further processing. A conflict may occur when two users edit the same content container of the shared object (e.g., the same table values, the same sentence). A conflict between different user revisions may result asynchronously. For example, a user may revise a locally cached version of the shared object when not connected to a server. The revisions are synchronized with the shared object when the user reconnects to the server. However, the revisions may conflict with other revisions that have already been synchronized with the shared object.

For example, revision R4 is an extension of revision R3. Revision R4 deletes outline element node 350 from outline node 344. The latest version of the shared object is determined to include revision R2. A comparison between revision R2 and revision R4 identifies a conflict because outline element node 350 is present in revision R2 but has been deleted in revision R4.

A three-way merge is performed between a master version of a content container and two divergent versions of the content container to resolve the conflicts. For example, content container R0 (i.e., the master version), revision R2, and revision R4 are merged to establish the current version of the shared object. The master version of a content container may be the version that was last synchronized with the shared object on the server. The master version includes non-conflicting revisions.

The conflicting content containers are reconciled and merged into the shared object by following a set of rules established by a merge algorithm. The merge algorithm determines which revisions are synchronized with the shared object. For example, different users may be ranked according to priority such that one user's revisions take precedence over all other users (i.e., primary edits). When a lower priority user attempts to revise a content container of the shared object that has already been revised by a higher priority user, the user is informed that the revisions (i.e., secondary edits) will not be synchronized the shared object. Thus, the primary edits are displayed on a master page of the shared object and any secondary edits are flagged as not being synchronized with the shared object.

In another example, revisions made to a shared object on a server have priority over revisions made locally on a client. The server copy of the shared object is deemed the master version because many different users have potentially accessed and revised the shared object on the server. Only one user has accessed and revised a locally stored version. Revised content containers that are not synchronized with the shared object (e.g., secondary edits) are identified as conflicting. The conflicting content containers are preserved by being stored on conflict pages associated with the corresponding master page of the shared object.

Figure 4:
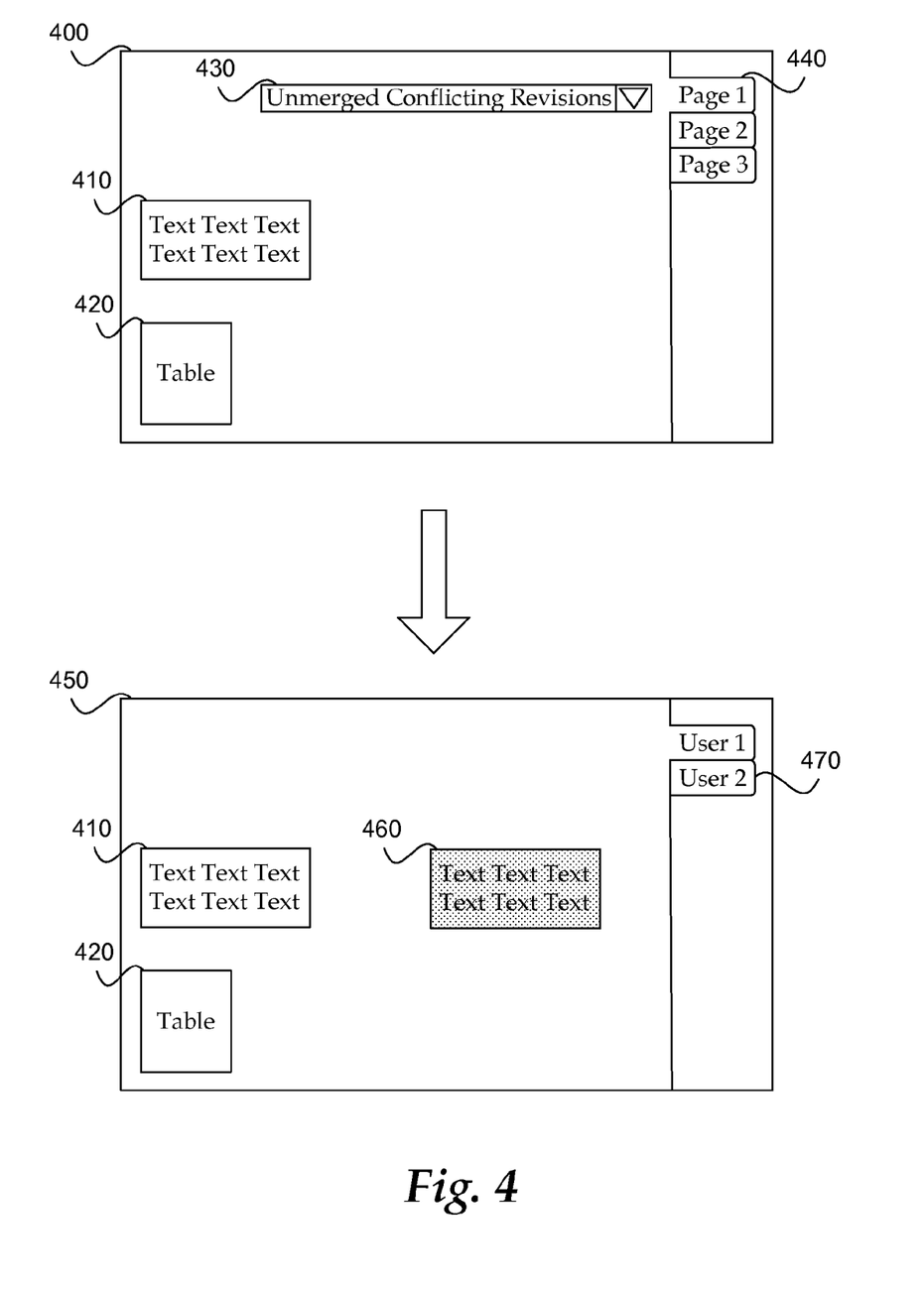
FIG. 4 illustrates a master page of a shared object and an associated conflict page, in accordance with the present invention.

FIG. 4 illustrates a master page of a shared object and an associated conflict page. Master page 400 includes non-conflicting revisions such as content containers 410, 420. Any unmerged conflicting revisions are identified on master page 400 by a conflict indicator. In one embodiment, the conflict indicator is drop down menu 430. The first entry of drop down menu 430 may be the most recent conflicts generated by the user. The entry of drop down menu 430 may include the user's name and a corresponding time stamp. Another entry in drop down menu 430 may include other conflict pages that the user generated but did not reconcile. Other entries in drop down menu 430 may correspond to conflict pages generated by other users. Selecting an entry from drop down menu 430 displays the corresponding conflict page with the conflicting revisions highlighted to draw the user's attention to the revisions that were not merged in the master version of the shared object. Thus, the user may either reconcile and merge the conflicts with master page 400 or decide that the conflicts are irrelevant.

In another embodiment, the conflict indicator is a tab. The master page may be associated with tab 440. Corresponding conflict pages may also be associated with tabs that are distinct from tab 440. For example, the conflict page tabs may be indented with respect to tab 440 or collapsed below tab 440. The conflict page that includes unmerged conflicts associated with a particular user may be identified by a tab that is distinct from the other tabs such that the user's attention is drawn to the conflict pages generated by that user. The user may then select the tab to navigate to the corresponding conflict page.

The selected conflict page may be displayed alongside the corresponding master page of the shared object such that the user may reconcile and merge any conflicting revisions in view of the merged revisions. Conflict page 450 is associated with master page 400. Conflict page 450 resembles master page 400 except that any conflicting content containers are highlighted to indicate that the conflict has not been resolved. For example, content container 460 is presented with a highlighted background to draw the user's attention to the unmerged conflict. Content container 460 may have been deleted and synchronized with the shared object before a user revised data in content container 460 thereby creating a conflict. The user may select content container 460 to merge the revision on master page 400.

In one embodiment, a conflict page is associated with one particular user. Thus, more than one conflict page may be associated with master page 400 when more then one user makes revisions on a page that cannot be merged. All conflicting revisions are stored for all users who are authorized to access the shared object. The user who accesses the conflict page presumably is most concerned with the conflicts generated by that user such that the user may reconcile those conflicts. For example, User 1 is presented with his corresponding conflict page when he selects the conflict indicator. The user may also view a conflict page associated with another user. For example, User 1 may select tab 470 to navigate to a conflict page associated with User 2.

Many conflict pages associated with one master page of the shared object may accumulate over time. During that time period, the user may have synchronized several revisions with the master version of the shared object located on a server while ignoring any corresponding conflict pages. Thus, the older conflict pages that the user did not reconcile are presumably no longer relevant. In one embodiment, any conflict pages identified as irrelevant may be purged after a predetermined time period has elapsed and the user has synchronized revisions of the page during that time period. For example, the three most recent conflict pages associated with any master page are preserved while any other associated conflict pages are purged after a month from creation.

In one embodiment, conflict pages are not created during real time communication because conflicts may occur more frequently than during asynchronous communication. Instead, users may collaboratively revise the same content container. Any conflicts may be immediately disposed of since all users can quickly determine if their revisions have been implemented. Alternatively, a user is notified that another user is revising a particular content container. The user may be encouraged to revise a different content container until the other user's revisions are complete.

Figure 5:
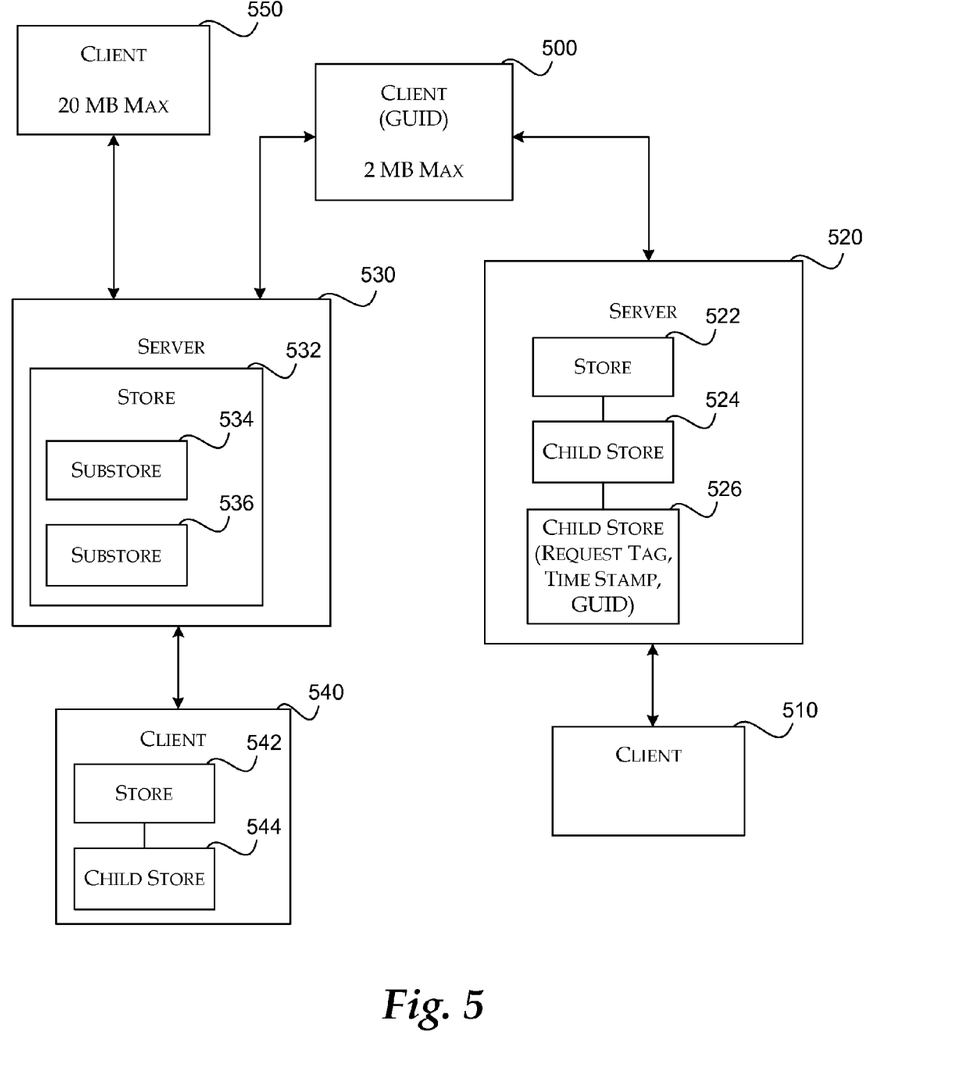
FIG. 5 illustrates a block diagram of a system for synchronizing multiple user revisions to a shared object, in accordance with the present invention.

FIG. 5 illustrates a block diagram of a system for synchronizing multiple user revisions to a shared object. The system includes clients 500, 510, 540, 550 and servers 520, 530. Client 500 is coupled to servers 520, 530. Client 510 is coupled to server 520. Clients 540, 550 are coupled to server 530. Client 540 includes store 542 and child store 544. Server 520 includes store 522 and child stores 524, 526. Server 530 includes store 532. Store 532 includes substores 534, 536.

Stores 522, 532, child stores 524, 526, and substores 534, 536 may store revisions associated with a shared object. Store 522, 532, child stores 524, 526 and substores 534, 536 are hierarchical. For example, store 522 may be associated with an entire shared notebook document. Child store 524 may be associated with a section of the shared notebook document. Child store 526 may be associated with a page of the shared notebook document. In one embodiment, only the most recent version of the top-level shared object is included in store 522. Store 532 may store an entire top-level shared object. Substores 534, 536 are associated with portions of the shared object. For example, substore 534 may be associated with a section of the shared object, and substore 536 may be associated with a different section of the shared object.

An application may load a shared object from server 520 or server 530 to client 500 without a current version of a particular content container of the shared object. For example, client 500 requests a shared object from store 522. The most recent available version of the shared object is presented at client 500. The most recent available version of the shared object may not correspond to the current version of the shared object because data of the most recent revision is not available in the corresponding child store 526. A request tag is assigned to child store 526 to indicate that client 500 requires the most recent revision data to update the shared object. Child store 526 may also be assigned a time stamp that identifies the time and date when client 500 requested the revision data from child store 526. Child store may also be assigned a GUID that identifies the client that requested the data (e.g., client 500). The request tag, time stamp, and GUID are used to inform client 500 when another client accesses child store 526. For example, client 510 may access child store 526 with the most current revision data. Thus, client 500 is informed that the most current revision data of the shared object is available in child store 526.

Client 500 may be a user's home computer and client 540 may be a user's work computer. Server 530 may be an exchange server that transfers a revision file between clients 500, 540. The revision file may be used to update a shared object stored on clients 500, 550. In one embodiment, client 500 is restricted from handling files larger than a predetermined size (e.g., 2 megabytes). For example, client 500 may include an email application that limits the size of email messages that may be received. Store 542 includes revisions associated with a top-level shared object. Child store 544 includes revisions associated with a content container of the shared object.

Client 540 may poll server 530 to determine whether another client has submitted a data revision request. Client 540 may satisfy the request when the latest version of the requested data revision is available in store 542 or child store 544. Client 540 may transfer the entire requested revision to client 500 if the size of the revision file is less than the limit that can be handled by client 500. If the size of the revision file is greater than the limit, the file may be divided into smaller files that are less than the limit. Alternatively, the size of the revision file may be reduced by deleting previous requests. The smaller files are then transferred from client 540 to client 500 through server 530.

Multiple requests for revision data may be waiting on a server. In one embodiment, the requests may be made from different clients (e.g., clients 500, 550). Each requesting client may be associated with a different file size limit. For example, client 500 is limited to files less than 2 megabytes and client 550 may handle files up to 20 megabytes. Therefore, both requests cannot be satisfied through one transfer transaction when the revision file is greater than 2 megabytes. In one embodiment, a priority bit is associated with each requesting client to establish the order in which the requests are satisfied.

The requests are satisfied by synchronizing the revision file with clients 500, 550. The revision file may be synchronized with clients 500, 550 in one transaction or through a series of multiple transactions depending on the size of the revision file. Each client 500, 550 determines that the request is satisfied when the entire revision file is synchronized. Client 540 may purge the requested data because the requests are satisfied. Client 540 may later poll server 530 to determine if any additional requests are waiting to be satisfied.

Figure 6:
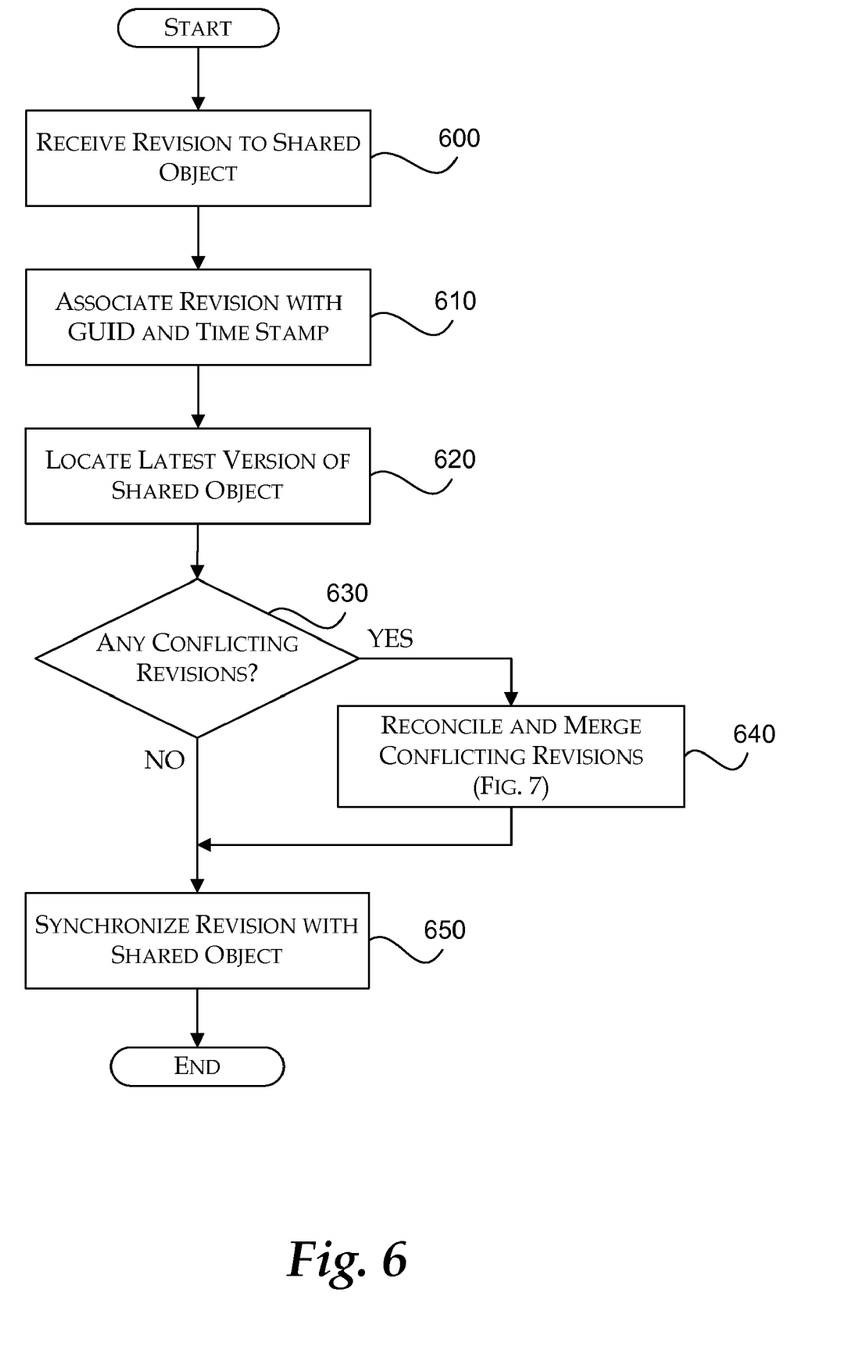
FIG. 6 illustrates an operational flow diagram illustrating a process for synchronizing multiple user revisions to a shared object, in accordance with the present invention.

FIG. 6 illustrates an operational flow diagram illustrating a process for synchronizing multiple user revisions to a shared object. The process begins at a start block where many users are authorized to access and revise a shared object simultaneously (i.e., the peer group). The object may be any entity capable of being shared such as a file. The peer group may be identified by a peer group identifier. Different versions of the shared object are identified by corresponding GUIDs and time stamps. The time stamp identifies the time when the shared object was last synchronized with a revision.

Moving to block 600, a user revises the shared object. The shared object may be revised on a server, in a local cache, or on a peer-to-peer network. In one embodiment, the revision is stored as a revision file. Proceeding to block 610, the revision is associated with a GUID and a time stamp. The time stamp identifies the time when the user revised the shared object.

Advancing to block 620, the latest version of the shared object is located. The latest version of the shared object is the version that includes the most recent revisions that are synchronized with the shared object and made available to other authorized users. The latest version of the shared object may be determined from the time stamps and GUIDs associated with different versions of the shared object.

Transitioning to decision block 630, a determination is made whether any conflicting revisions exist. Revisions may conflict when different users revise the same content container. The revision cannot be synchronized with the shared object if conflicting revisions exist. If conflicting revisions exist, processing continues at block 640 where the conflicting revisions are reconciled and merged (as discussed with reference to FIG. 7). If no conflicting revisions exist, processing continues at block 650 where the revision is synchronized with the shared object such that other users may view the revision. Processing then terminates at an end block.

Figure 7:
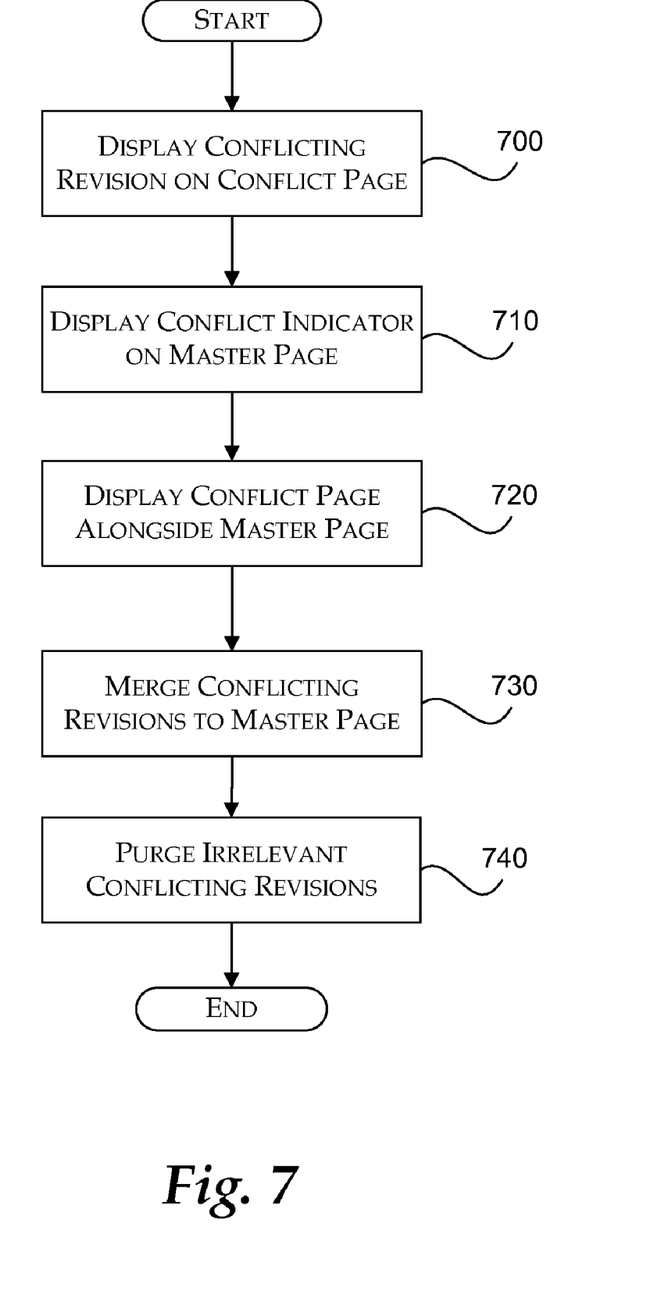
FIG. 7 illustrates an operational flow diagram illustrating a process for reconciling and merging conflicting revisions from multiple users in a shared object, in accordance with the present invention.

FIG. 7 illustrates an operational flow diagram illustrating a process for reconciling and merging conflicting multiple user revisions to a shared object. The process begins at a start block where more than one user has revised the same content container in a shared object. A conflict results when one of the revised content containers is synchronized with the shared object such that any other revisions to the content container cannot be synchronized.

Moving to block 700, the conflicting revision is displayed on a conflict page. The conflict page resembles the corresponding master page except that the conflicting revision is highlighted and displayed in place of the synchronized revision.

Proceeding to block 710, a conflict indicator is displayed on the master page of the shared object. The conflict indicator may be a drop down menu, a tab, or any other mechanism that informs a user that a conflict page is available for the master page. The conflict indicator for a conflict page associated with a particular user may be distinct from the conflict indicator for conflict pages associated with other users such that a current user may quickly identify the conflict pages generated by the current user.

Advancing to block 720, the conflict page is displayed alongside the master page when the conflict indicator is selected. The user is presented with both the synchronized state of the master page and the corresponding conflict page.

Transitioning to block 730, the user reconciles and merges the conflicting revisions into the master page. In one embodiment, the user may select the content container such that the content container is merged with the master page. In another embodiment, the user may directly implement revisions onto the master page. In yet another embodiment, the user may identify conflicting revisions as irrelevant.

Continuing to block 740, conflicting revisions that are identified as irrelevant are purged. In one embodiment, conflicting revisions may be identified as irrelevant by a user. In another embodiment, conflicting revisions may be automatically identified as irrelevant. For example, a user may have synchronized several revisions with the master version of the shared object located on a server while ignoring any corresponding conflict pages. The older conflict pages that the user did not reconcile are identified as irrelevant after a predetermined time period has elapsed. Processing then terminates at an end block.

Figure 8:
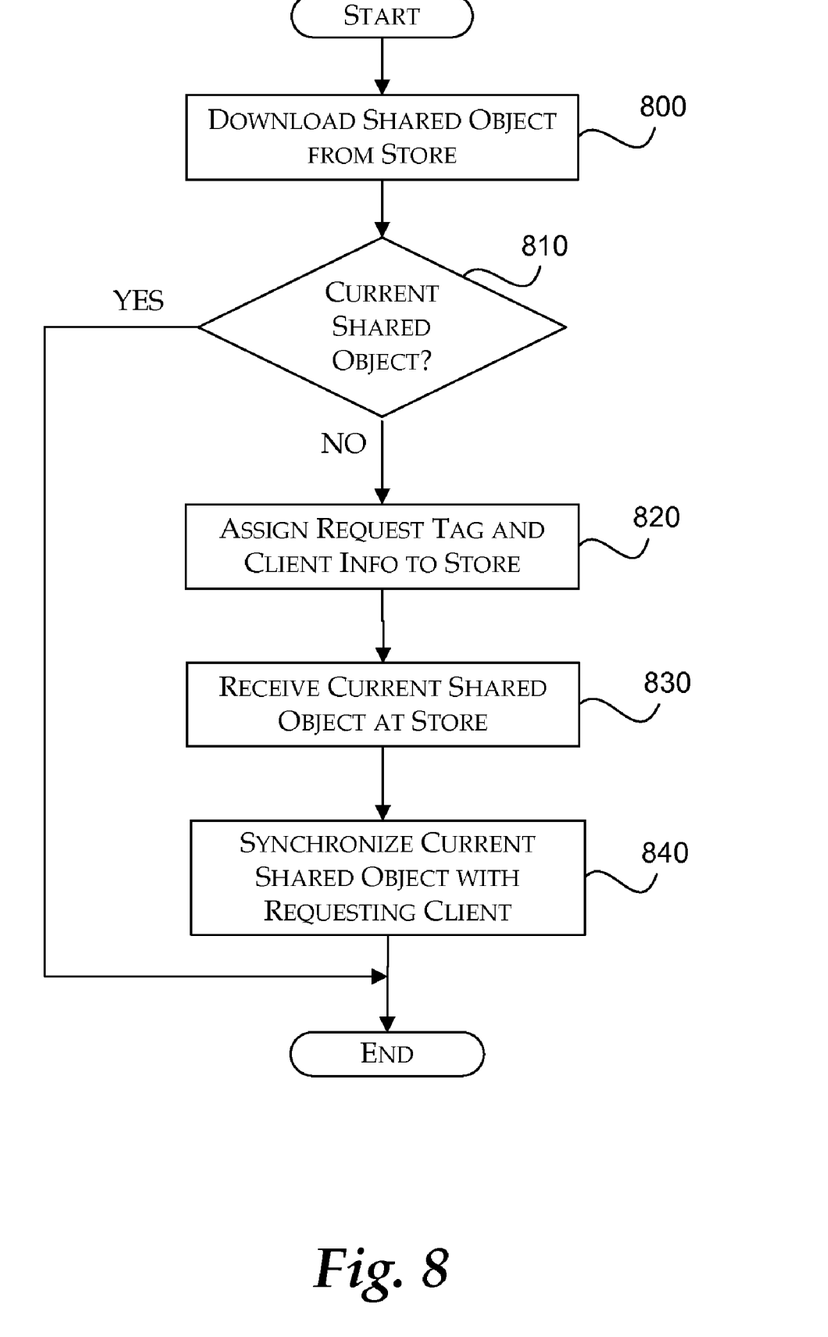
FIG. 8 illustrates an operational flow diagram illustrating a process for synchronizing multiple user revisions to a shared object, in accordance with the present invention.

FIG. 8 illustrates an operational flow diagram illustrating a process for synchronizing multiple user revisions to a shared object. The process begins at a start block where different versions of shared object are stored in different locations throughout a system. Moving to block 800, the shared object is downloaded from a store to a client.

Proceeding to decision block 810, a determination is made whether the shared object is the current version of the shared object. If the shared object is the current version of the shared object, processing terminates at an end block. If the shared object is not the current version of the shared object, processing continues at block 820. The shared object may not be the current version because the most recent revision to a content container of the shared object is not available from the store.

Advancing to block 820, a request tag and client information are assigned to the store to indicate that the client requires the most recent revision data to update the shared object. The client information may include a GUID that identifies the requesting client and a time stamp that identifies the time when the client requested the current version of the shared object from the store.

Transitioning to block 830, the current version of the shared object is received at the store. The store may receive the current version of the shared object when another client accesses the store with the most recent revision data. The requesting client is informed that the current version of the shared object has been received by the store. Continuing to block 840, the current version of the shared object is synchronized with the requesting client. Processing then terminates at the end block.

Figure 9:
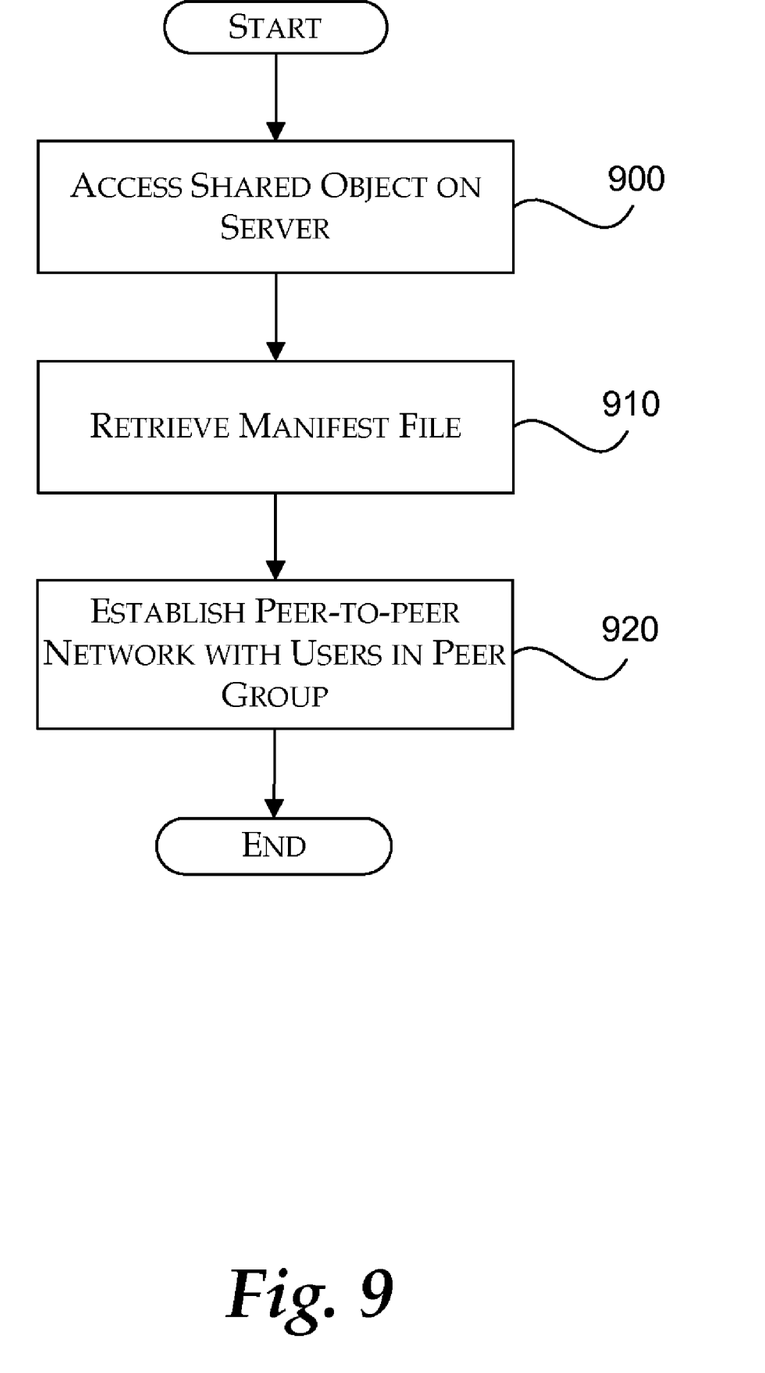
FIG. 9 illustrates an operational flow diagram illustrating a process for seamlessly transitioning from asynchronous to synchronous communication modes, in accordance with the present invention.

FIG. 9 illustrates an operational flow diagram illustrating a process for seamlessly transitioning from asynchronous to synchronous communication modes. The process begins at a start block where a peer group is established that identifies users who are authorized to access a shared object.

Moving to block 900, a client accesses the shared object on a server. The client is automatically connected to other clients that are also accessing the shared object (i.e., the peer group). The shared object is associated with a manifest file. The shared object includes a unique location identifier that identifies the location where the corresponding manifest file is stored in the system.

Proceeding to block 910, the manifest file is retrieved from the location identified by the unique location identifier. The manifest file identifies the locations where other versions and instances of the shared object are stored within the system. The manifest file includes a peer group identifier for the peer group where a version of the shared object is stored.

Advancing to block 920, a peer-to-peer network is established when any other client in the peer group accesses a version or instance of the shared object identified by the manifest file. Thus, the client may disconnect from the server and continue to access the shared file on the peer-to-peer network. Processing then terminates at an end block.

Figure 10:
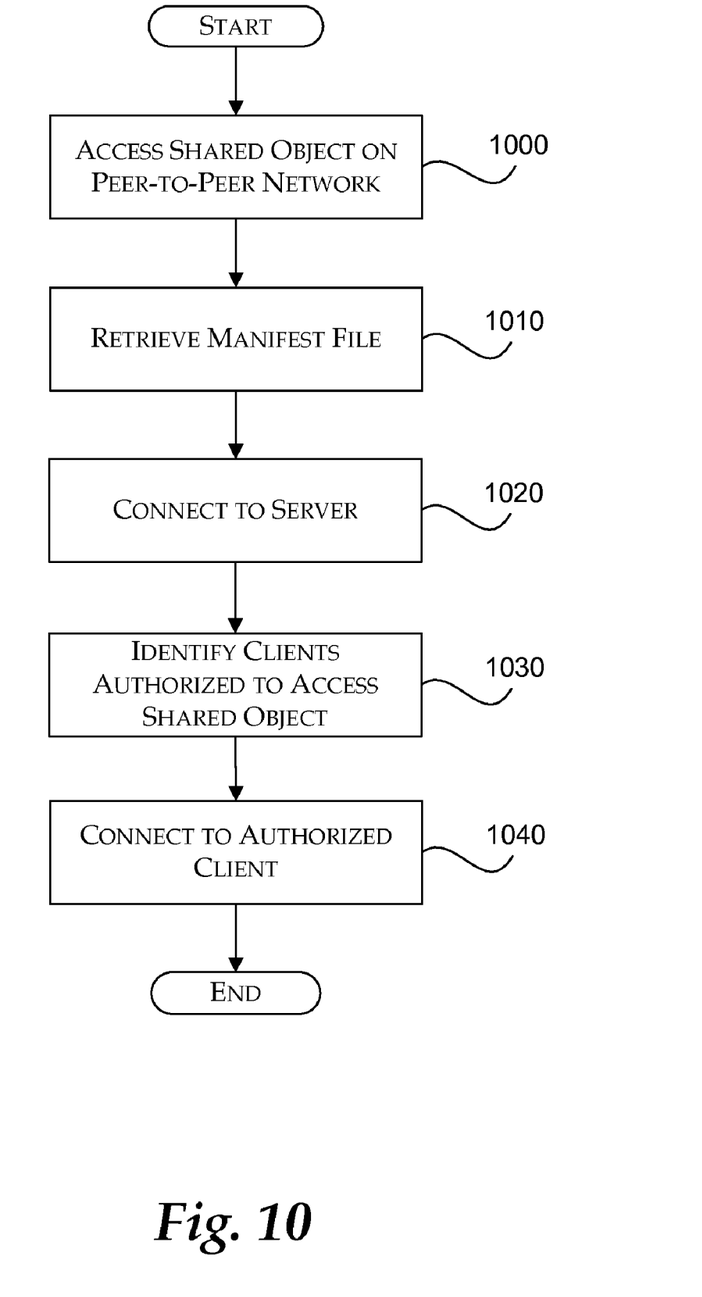
FIG. 10 illustrates an operational flow diagram illustrating a process for seamlessly transitioning from synchronous to asynchronous communication modes, in accordance with the present invention.

FIG. 10 illustrates an operational flow diagram illustrating a process for seamlessly transitioning from synchronous to asynchronous communication modes. The process begins at a start block where a peer-to-peer network is established between at least two users who are authorized to access a shared object.

Moving to block 1000, a client accesses the shared object on the peer-to-peer network. The shared object is associated with a manifest file. The shared object includes a unique location identifier that identifies the location where the corresponding manifest file is stored in the system.

Proceeding to block 1010, the manifest file associated with the shared object is retrieved from the location identified by the unique location identifier. The manifest file identifies the locations where other versions and instances of the shared object are stored within the system. Advancing to block 1020, the client connects to a server. The client determines which other clients are also connected to the server. Transitioning to block 1030, the client identifies other clients that are authorized to access the shared object from the peer-to-peer network. Continuing to block 1040, the client connects to an authorized client when the peer-to-peer network is unavailable. Processing then terminates at an end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method executing on a processor for transitioning between communication modes in a collaborative environment, comprising:

accessing a shared object to form a first network communication mode;

accessing a manifest file using a location identified by a location identifier included with the shared object, wherein the manifest file identifies a network location for each of concurrently accessed instances of the shared object;

receiving an indication to change network communication modes;

based on the manifest file identification of network locations for the concurrently accessed instances of the shared object, automatically transitioning to a second network communication mode with each of the concurrently accessed instances of the shared object, wherein the second network communication mode is different than the first network communication mode; and synchronizing revisions made to the shared object.

2. The method of claim 1, further comprising receiving the revisions made to the shared object at different locations comprising at least two of: a server, a local cache and a peer-to-peer network.

3. The method of claim 1, wherein the shared object comprises content containers that each includes shared object content that is grouped together.

4. The method of claim 3, further comprising determining when a revision is made to a content container of the shared object and storing a revision container that includes the revision along with the content container within the shared object.

5. The method of claim 4, wherein synchronizing the revisions made to the shared object comprises determining the revision container that are stored within the shared object to synchronize.

6. The method of claim 3, wherein different users simultaneously revise different content containers within the shared object and wherein each revision is associated with a Globally Unique Identifier (GUID) and a time stamp that identifies a time when a user revised one of the content containers.

7. The method of claim 3, wherein synchronizing the revisions to the shared object comprises determining when conflicting revision containers exist within the shared object.

8. The method of claim 7, further comprising reconciling and merging the conflicting revision containers when it is determined that conflicting revisions exist to the shared object.

9. The method of claim 1, further comprising displaying a conflicting revision on a conflict page when conflicting revisions exist to the shared object.

10. The method of claim 9, further comprising displaying a conflicting indicator on a master page of the shared object that informs a user that the conflict page is available for the master page.

11. A computer-readable storage medium having computer-executable instructions stored thereon for transitioning between communication modes in a collaborative environment, the instructions comprising:

accessing a shared object that comprises content containers that each includes shared object content that is grouped together to form a first network communication mode;

accessing a manifest file using a location identified by a location identifier included with the shared object, wherein the manifest file identifies a network location for each of concurrently accessed instances of the shared object;

receiving an indication to change network communication modes;

based on the manifest file identification of network locations for the concurrently accessed instances of the shared object, automatically transitioning to a second network communication mode with each of the concurrently accessed instances of the shared object, wherein the second network communication mode is different than the first network communication mode; and synchronizing revisions made to the shared object.

12. The computer-readable storage medium of claim 11, further comprising determining when a revision is made to a content container of the shared object and storing a revision container that includes the revision along with the content container within the shared object.

13. The computer-readable storage medium of claim 12, wherein synchronizing the revisions made to the shared object comprises determining the revision container that is stored within the shared object to synchronize.

14. The computer-readable storage medium of claim 13, further comprising reconciling and merging the conflicting revision containers when it is determined that conflicting revisions exist to the shared object.

15. The computer-readable storage medium of claim 11, further comprising displaying a conflicting revision on a conflict page when conflicting revisions exist to the shared object.

16. The computer-readable storage medium of claim 15, further comprising displaying a conflicting indicator on a master page of the shared object that informs a user that the conflict page is available for the master page.

17. A system for transitioning between communication modes in a collaborative environment, comprising:

a processor; and a memory having computer-executable instructions stored thereon, wherein the computer-executable instructions are configured for:

accessing a shared object that comprises content containers that each includes shared object content that is grouped together to form a first network communication mode;

accessing a manifest file using a location identified by a location identifier included with the shared object, wherein the manifest file identifies a network location for each of concurrently accessed instances of the shared object;

receiving an indication to change network communication modes;

based on the manifest file identification of network locations for the concurrently accessed instances of the shared object, automatically transitioning to a second network communication mode with each of the concurrently accessed instances of the shared object, wherein the second network communication mode is different than the first network communication mode; and synchronizing revisions made to the shared object.

18. The system of claim 17, further comprising determining when a revision is made to a content container of the shared object and storing a revision container that includes the revision along with the content container within the shared object.

19. The system of claim 18, wherein synchronizing the revisions made to the shared object comprises determining the revision container that is stored within the shared object to synchronize and reconciling and merging the conflicting revision containers when it is determined that conflicting revisions exist to the shared object.

20. The system of claim 17, further comprising displaying conflicting revisions on a conflict page when conflicting revisions exist to the shared object and receiving input to resolve the conflicting revisions.

\* \* \* \* \*